United States Patent
Yu et al.

(10) Patent No.: US 9,607,272 B1
(45) Date of Patent: Mar. 28, 2017

(54) SYSTEM AND METHOD FOR TRAINING DATA GENERATION IN PREDICTIVE CODING

(71) Applicant: Veritas Technologies LLC, Mountain View, CA (US)

(72) Inventors: Shengke Yu, Cupertino, CA (US); Venkat Rangan, Los Altos Hills, CA (US)

(73) Assignee: Veritas Technologies LLC, Mountain View, CA (US)

( * ) Notice: Subject to any disclaimer, the term of this patent is extended or adjusted under 35 U.S.C. 154(b) by 255 days.

(21) Appl. No.: 13/843,501

(22) Filed: Mar. 15, 2013

Related U.S. Application Data (60) Provisional application No. 61/710,452, filed on Oct. 5, 2012.

(51) Int. Cl.
*G06N 99/00* (2010.01)

(52) U.S. Cl.
CPC .................................. *G06N 99/005* (2013.01)

(58) Field of Classification Search
CPC ...... G06N 99/005; G06N 5/025; G06N 7/005; G06K 9/6256; G06K 9/6269
USPC ........................................................ 706/12
See application file for complete search history.

(56) References Cited

U.S. PATENT DOCUMENTS

| | | | | |
|---|---|---|---|---|
| 7,788,195 B1 * | 8/2010 | Subramanian et al. | ......... | 706/20 |
| 7,933,859 B1 * | 4/2011 | Puzicha et al. | ................ | 706/62 |
| 8,489,632 B1 * | 7/2013 | Breckenridge et al. | ....... | 707/778 |
| 8,533,194 B1 * | 9/2013 | Ravid et al. | .................. | 707/737 |
| 8,965,814 B1 * | 2/2015 | Rangan | ........................... | 706/12 |
| 2005/0071300 A1 * | 3/2005 | Bartlett et al. | .................. | 706/12 |
| 2008/0022844 A1 * | 1/2008 | Poliner et al. | .................. | 84/609 |
| 2010/0250473 A1 * | 9/2010 | Porikli et al. | ................... | 706/12 |
| 2010/0250474 A1 * | 9/2010 | Richards et al. | ............... | 706/12 |
| 2012/0191631 A1 * | 7/2012 | Breckenridge et al. | ........ | 706/12 |
| 2012/0296891 A1 * | 11/2012 | Rangan | ......................... | 707/722 |

OTHER PUBLICATIONS

Brinker K. "Active Learning with Kernel Machines", Disseration, University of Paderborn, Nov. 2004.*
Panda N. et al., "Active learning in very large databases", Multimed Tools Appl, 2006, 31, pp. 249-267.*
He H. et al., "Learning from Imbalanced Data", IEEE Transactions on Knowledge and Data Engineering, vol. 21, No. 9, Sep. 2009, pp. 1263-1284.*

(Continued)

*Primary Examiner* — Dave Misir
(74) *Attorney, Agent, or Firm* — Wilmer Cutler Pickering Hale and Dorr LLP (57) ABSTRACT

A predictive coding system updates a plurality of training documents for an untrained classification model based on a plurality of additional documents. The plurality of additional documents are selected from a plurality of unlabeled documents based on a decision hyperplane associated with a first trained classification model. The predictive coding system provides the updated plurality of training documents to the untrained classification model to cause the untrained classification model to be retrained and to cause a second trained classification model to be generated.

12 Claims, 5 Drawing Sheets

(56) References Cited

OTHER PUBLICATIONS

Tong S. et al., "Support Vector Machine Active Learning with Applications to Text Classification", Journal of Machine Learning Research, 2001, pp. 45-66.*

Brinker, Klaus; "Incorporating Diversity in Active Learning with Support Vector Machines", Proceedings of the Twentieth International Conference on Machine Learning (ICML-2003), 2003, pp. 1-8.

Ertekin, Seyda et al., "Learning on the Border: Active Learning in Imbalanced Data Classification", ACM Conf. on Information and Knowledge Management (CIKM '07), pp. 1-10, Nov. 6-8, 2007.

Chris Dale, "Equivio>Relevance Putting What Matters First," White Paper from Equivio Ltd., Retrieved from the Internet on Oct. 28, 2014, 14 pages, World Wide Web, http://www.equivio.com/files/files/White%20Paper%20-%20Equivio%20Relevance%20Putting%20What%20Matters%20First.pdf.

Tom Groom, "Three Methods for eDiscovery Document Prioritization: Comparing and Contrasting Keyword Search with Concept Based and Support Vector Based 'Technology Assisted Review-Predictive Coding' Platforms," Blog Post, Apr. 9, 2012, pp. 1-13,World Wide Web, http://www.jdsupra.com/post/fileServer.aspx?fName=af05a22e-b3f2-40f3-aa84-a3297099fa6f.pdf.

No Author, "DiscoverText, Unlock the Power of Text," Texifter, LLC Product Sheet, Retrieved from the Internet on Oct. 28, 2014, 2 pages, World Wide Web, http://texifter.com/media/resources/DiscoverText-ProductSheet.pdf.

No Author (from Servient, Inc.), "Predictive Review: Improving E-Discovery With Active Learning Technology", A Servient Whitepaper, Dec. 2010, 8 pages.

Maura R. Grossman et al., "Technology-Assisted Review in E-Discovery Can Be More Effective and More Efficient Than Exhaustive Manual Review," Richmond Journal of Law and Technology, 2011, pp. 1-48, vol. 17, Issue 3, World Wide Web, http://jolt.richmond.edu/v17i3/article11.pdf.

No Author (retrieved from Internet thru Wikepedia, the free encyclopedia on Jun. 30, 2015), "Active learning (machine learning)", http://en.wikipedia.org/wiki/Active_learning_(machine_learning).

U.S. Appl. No. 13/729,743, filed Dec. 28, 2012 entitled Method and System for Information Retrieval Effectiveness Estimation in E-Discovery.

U.S. Appl. No. 13/474,602, filed May 17, 2012 entitled Enhancing Training of Predictive Coding Systems Through User Selected Text.

U.S. Appl. No. 13/421,226, filed Mar. 15, 2012 entitled Selection of Most Effective Machine Learning Kernel From a Training set of Documents.

* cited by examiner

SYSTEM AND METHOD FOR TRAINING DATA GENERATION IN PREDICTIVE CODING

RELATED APPLICATIONS

This application is related to and claims the benefit of U.S. Provisional Patent application Ser. No. 61/710,452, filed Oct. 5, 2012, which is hereby incorporated by reference.

TECHNICAL FIELD

Embodiments of the present invention relate to electronic discovery, and more particularly, to a technique for training data generation in predictive coding.

BACKGROUND

Reviewers that review data sets, for example, during electronic discovery (e-discovery), may encounter data sets that contain millions of electronic discovery documents. Each of these electronic discovery documents may need to be evaluated by the reviewers and a binary determination may be made of a class or category for the documents. Categories may include confidential, not confidential, relevant, not relevant, privileged, not privileged, responsive, not responsive, etc. Manually reviewing the millions of electronic discovery documents in a group, or corpus, of documents is impractical, expensive, and time consuming.

A technology-assisted review system, such as a predictive coding system, can implement automated review of electronic discovery documents using predictive coding. Predictive coding using machine learning is a technique commonly implemented to automatically review and classify a large number of electronic discovery documents in a corpus of documents. Some approaches of machine learning can use a subset of the corpus of documents, called a training set, to train a classification model (e.g., a Support Vector Machine (SVM) model), and use the trained classification model to classify the remaining unclassified or unlabeled electronic discovery documents. Some approaches can use multiple training sets for machine learning (e.g., incrementally enhanced training sets) and/or can perform more than one round of machine learning (train, validate, train, validate, . . . , train, validate, test, etc.).

An SVM can be based on the concept of decision hyperplanes that define decision boundaries. A decision hyperplane can separate documents based on their class memberships (e.g., confidential, not confidential, relevant, not relevant, privileged, not privileged, responsive, not responsive, etc.). For example, documents can be classified by drawing a hyperplane (e.g., line) that defines a class boundary. On a first side of the boundary, all documents belonging to a first class (e.g., confidential) lie and on a second side of the boundary, all documents belonging to a second class (e.g., not confidential) lie. After the training phase is completed, new documents that were not part of the training set can be automatically classified. Any unclassified document can be classified by determining which side of the boundary it falls on. If the document falls to the first side, it can be classified as belonging to the first group, and if the document falls to the second side, it can be classified as belonging to the second group.

However, to train the classification model, human review is still necessary for the training set. A current solution requires the training set to include a large number of training documents and a human reviewer to review the large number of training documents in order to train an effective predictive coding classification model. Moreover, if most training documents are not informative, even if the training set is very large, a highly effective trained classification model is not attainable, even at a very high human review cost.

SUMMARY

An exemplary predictive coding system may be programmed to generate training data for predictive coding. In one embodiment, the predictive coding system can incrementally enhance the training set for predictive coding if the classification model associated with the predictive coding system should be retrained. The retraining can be performed in multiple iterations, with the classification model being retrained with an enhanced training set in each iteration. In each iteration, the predictive coding system updates a plurality of training documents for a classification model based on a plurality of additional documents. In one embodiment, the plurality of additional documents are selected from a plurality of unlabeled documents based on a decision hyperplane associated with a first trained classification model. In one embodiment, in each iteration, the predictive coding system provides the updated set of training documents to the classification model to cause the classification model to be retrained based on the updated set of training documents and thereby generate a second trained classification model.

In one embodiment, the predictive coding system determines an effectiveness of the second trained classification model upon the classification model being retrained, determines whether to retrain the classification model, and upon determining that the classification model should be retrained, repeats the updating of the plurality of training documents for the classification model.

In one embodiment, the predictive coding system determines whether to retrain the classification model by calculating an effectiveness measure of the second trained classification model on a set of validation documents or determining whether a new support vector is associated with the second trained classification model.

In one embodiment, the predictive coding system selects the plurality of additional documents from a plurality of unlabeled documents based on the decision hyperplane associated with the first trained classification model. The predictive coding system selects each additional document of the plurality of additional documents by selecting a predetermined number of documents from the plurality of unlabeled document, calculating a score for each selected document of the plurality of selected documents based on the decision hyperplane, comparing a plurality of scores for the plurality of selected documents, and selecting one of the plurality of selected documents as the additional document based on the comparing.

In one embodiment, the predictive coding system calculates the score for each chosen document by calculating a distance from the selected document to the decision hyperplane, calculating an angle diversity value for the selected document, and calculating the score for the selected document based on the distance and the angle diversity value.

In one embodiment, the predictive coding system selects one of the plurality of selected documents as the additional document based on the comparing by selecting the selected document with a score that is the lowest in the plurality of scores.

In one embodiment, a number of the plurality of additional documents is a predefined value.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for training data generation in a predictive coding system.

Reviewers or an administrator may have millions of electronic discovery documents to review in relation to electronic discovery. Automated predictive coding using machine learning can be used to assist in reviewing and classifying a large number of electronic discovery documents (e.g., a corpus of documents). In order to classify a corpus of electronic discovery documents, a subset of the electronic discovery documents (e.g., 100 to 10000 documents) may be selected as training data for the machine learning. The training data can be a set of training documents. The training documents may be reviewed by expert reviewers and categorized into one or more classes or categories and associated with a label.

The training documents may then be used to train a classification model for the predictive coding system. Once the classification model has been trained (e.g., to generate a first trained classification model), the effectiveness of the predictive coding system can be determined for a set of validation documents selected from the corpus of electronic discovery documents. The effectiveness of the predictive coding system can be based on the quality of the trained classification model once the classification model has been trained, and can be determined by comparing a predictive coding system classification for each validation document and a user classification for each validation document. Therefore, the quality of the training documents is crucial to the quality and effectiveness of the trained classification model and the effectiveness of the predictive coding system that uses the trained classification model.

If the effectiveness of the trained classification model is undesirable, the classification model may need to be retrained to improve the effectiveness (e.g., generate a second trained classification model). The classification model can be retrained based on an updated training set enhanced with a small number of additional documents selected from the unlabeled electronic discovery documents in the corpus of documents. The additional documents that are selected are informative documents that can improve the effectiveness of the classification model. The set of training documents can be updated to include the additional documents and the classification model can then be retrained using the updated set of training documents. With a small set of very informative documents selected as the training documents for the classification model, a highly effective trained classification model can be built at a human review cost that is as low as possible.

Figure 1:
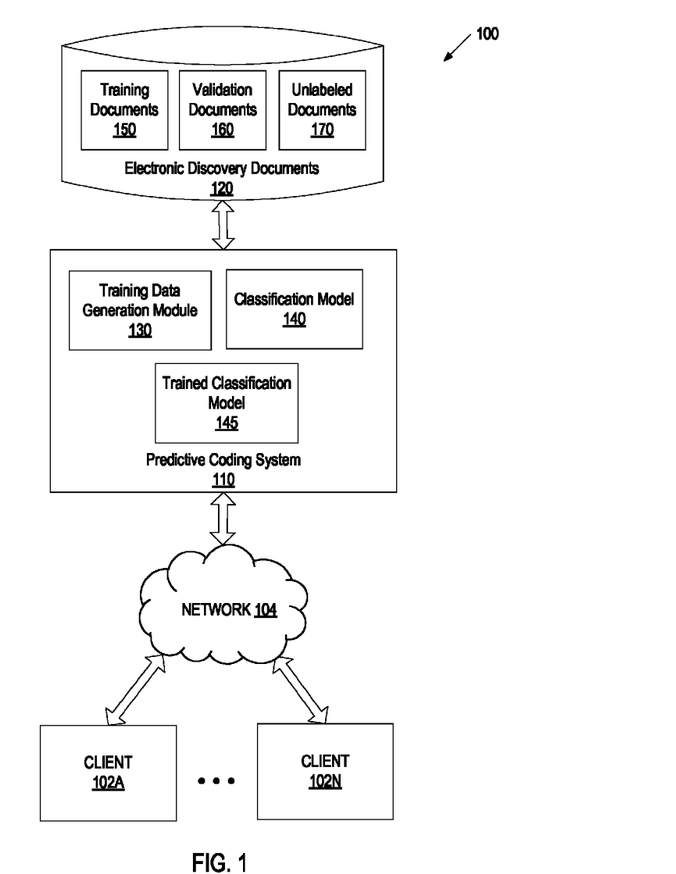
FIG. 1 illustrates exemplary system architecture, in accordance with various embodiments of the present invention.

FIG. 1 illustrates exemplary system architecture 100 in which embodiments can be implemented. The system architecture 100 includes a predictive coding system 110, an electronic discovery documents data repository 120, and client machines 102A-102N connected to a network 104. Network 104 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

Predictive coding system 110 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the predictive coding system 110 is deployed as a network appliance (e.g., a network router, hub, or managed switch).

Electronic discovery documents data repository 120 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing devices. In some embodiments, electronic discovery documents data repository 120 might be a network-attached file server, while in other embodiments electronic discovery documents data repository 120 might be some other type of persistent storage such as an object-oriented database, a relational database, and so forth.

The data in the electronic discovery documents data repository 120 can include a corpus of electronic discovery documents that need to be reviewed and classified. Examples of electronic discovery documents can include, and are not limited to, electronic discovery documents which have been divided into a set of training documents that have been selected by an administrator (document reviewer, etc.), a set of validation documents that have been selected by an administrator (document reviewer, etc.), an unlabeled remainder of electronic discovery documents that need to be classified or labeled, and any other electronically stored information that can be associated with electronic discovery documents, etc.

The client machines 102A-102N may be personal computers (PC), laptops, mobile phones, tablet computers, or any other computing devices. The client machines 102A-102N may run an operating system (OS) that manages hardware and software of the client machines 102A-102N. A user interface (not shown) may run on the client machines (e.g., on the OS of the client machines). The user interface may present documents from electronic discovery document data repository 120. The user interface can receive information from the client machines 102A-102N, such as a classification for one or more of the electronic discovery documents in the electronic discovery document data repository 120 or an indication from a user of one or more of the client machines 102A-102N of whether to further improve an effectiveness of the predictive coding system 110. The client machines 102A-102N may also upload new electronic discovery documents to the predictive coding system 110 for storage and/or classification (e.g., in electronic discovery document data repository 120).

During operation of system 100, a predictive coding system 110 can train a (untrained) classification model 140, to generate a (first) trained classification model 145. To train the classification model 140, an initial training set of documents is needed by the predictive coding system 110. To generate the initial training set, the predictive coding system defines a set of query/search terms based on a topic of interest. The topic of interest can be provided by a user or administrator of the predictive coding system 110. The predictive coding system 110 can perform a search (keyword search and/or concept search) with the (stemmed) terms on the electronic discovery documents in electronic discovery documents data repository 120 and can return documents based on the search. In one embodiment, the predictive coding system 110 selects all documents returned by the search as training documents. In an alternate embodiment, the predictive coding system 110 selects a predetermined number of documents returned by the search as the training documents. For example, the predictive coding system 110 can select 1000 random documents from the documents returned by the search as training documents.

The predictive coding system 110 can cause a user interface to be presented to an administrator or reviewer via client device 102A-102N. The user interface can present the training documents to the administrator or reviewer and request one or more inputs from the administrator or reviewer on the client device 102A-102N over network 104, such as a label or a classification for each training document (e.g., confidential, not confidential, relevant, not relevant, privileged, not privileged, responsive, not responsive, etc.).

The predictive coding system 110 can add each of the documents labeled by the user to a set of training documents, such as training documents 150 in the electronic discovery documents data repository 120. The predictive coding system 110 can train an untrained classification model, such as classification model 140 (e.g., an SVM model) using the set of training documents in training documents 150 to generate a trained classification model 145.

The validation documents 160 can include a set of validation documents used to validate the trained classification model 145 in the predictive coding system 110. The trained classification model 145 can classify the set of validation documents in the predictive coding system 110. The predictive coding system 110 can further present the set of validation documents to an administrator or reviewer via client device 102A-102N over network 104.

The predictive coding system 110 can cause a user interface to be presented to an administrator or reviewer via client device 102A-102N. The predictive coding system 110 can receive, via a user interface on client device 102A-102N, a classification for each document in the set of validation documents from the administrator or reviewer on the client device 102A-102N.

The predictive coding system 110 can determine an effectiveness of the trained classification model 145 based on the classification of each validation document in the validation documents 160 from the predictive coding system 110 and the classification of each validation document from the administrator or reviewer.

In one embodiment, the predictive coding system 110 includes a training data generation module 130. The training data generation module 130 can incrementally enhance the training set for predictive coding in one or more iterations, and retrain the classification model with the enhanced training set in each iteration. The training data generation module 130 can determine an effectiveness of the trained classification model 145 and determine whether the classification model 140 (e.g., untrained classification model) should be retrained. The training data generation module 130 can determine whether the classification model 140 should be retrained based on a user input, based on whether the effectiveness value improved from a last iteration, based on whether there are any new support vectors in a set of documents, which are selected from unlabeled documents 170, closest to the classification hyperplane of the current trained classification model, and unseen by this model before, etc.

If the training data generation module 130 determines that the classification model 140 should be retrained, the training data generation module 130 can generate training data from a subset of the unlabeled documents in unlabeled documents 170 and provide the training data to the predictive coding system 110 to cause the classification model 140 to be retrained by generating a new trained classification model 145 (e.g., a second trained classification model) that has an improved effectiveness than the previous trained classification model 145 (e.g., first trained classification model). In each iteration, the training data generation module 130 can generate the training data by selecting a predetermined number of additional documents from unlabeled documents 170 as training data. The training data generation module 130 can select each of the additional documents by randomly choosing a group of unlabeled documents from unlabeled documents 170, calculating a score for each document in the chosen group of unlabeled documents, and selecting the document in the chosen group of unlabeled documents with the lowest score.

The training data generation module 130 can cause a user interface to be presented to an administrator or reviewer via client device 102A-102N. The training data generation module 130 can present, via the user interface on client device 102A-102N, each of the additional documents to the administrator or reviewer and receive, via the user interface on client device 102A-102N, a classification for each additional document from the administrator or reviewer on the client device 102A-102N.

The training data generation module 130 can store the additional documents corresponding to the training data and the corresponding classifications for the additional documents as training documents in the training documents 150.

Upon determining that the training documents in the training documents 150 have been updated, the predictive coding system 110 can retrain the classification model 140 (e.g., an SVM model) using the updated training documents in training documents 150 to generate a new or updated trained classification model 145. The training data generation module 130 can determine an effectiveness of the (new or updated) trained classification model 145 (e.g., second trained classification model). In one embodiment, the predictive coding system 110 retrains the classification model 140 based on only the set of updated training documents in training documents 150, and may not be based on any previous training of the classification model 140. For example, if the classification model was previously trained using documents A1, . . . , A1000, and the updated set of training documents contains documents A1, . . . , A1000 and B1, . . . , B100, the classification model is retrained using documents A1, . . . , A1000 and B1, . . . , B100, without the use of any previous version of the trained classification model that was built using documents A1, . . . , A1000. In an alternate embodiment, the predictive coding system 110 incrementally retrains the classification model 140 based on a previously trained classification model that was built using a previous set of training documents. For example, if the classification model was previously trained using documents A1, . . . , A1000, and the updated set of training documents contains documents A1, . . . , A1000 and B1, . . . , B100, the classification model is retrained using the previously trained classification model that was built with documents A1, . . . , A1000, and including document B1, . . . , B100 in the retraining.

In some embodiments, the training data generation module 130 determines whether to continue to retrain the classification model 140 once the classification model 140 has been retrained. In one embodiment, the training data generation module 130 can determine whether to continue retraining the classification model 140 by causing a user interface to be presented to an administrator or reviewer via client device 102A-102N. The training data generation module 130 can present, via the user interface on client device 102A-102N, a request to an administrator or reviewer to decide whether to continue retraining the classification model 140. The training data generation module 130 can receive, via the user interface on client device 102A-102N, a response from the administrator or reviewer on the client device 102A-102N of whether or not the administrator or reviewer would like to continue retraining the classification model 140. In one embodiment, the training data generation module 130 can include an effectiveness of the trained classification model 145 in the user interface to assist the administrator or reviewer to make the decision.

In an alternate embodiment, the training data generation module 130 determines whether to continue retraining the classification model 140 by determining whether the effectiveness of the trained classification model 145 (e.g., second trained classification model) improved (e.g., greater value than a first trained classification model). For example, if the effectiveness of the trained classification model 145 improved from a last iteration of the classification model being trained (first trained classification model), the training data generation module 130 may determine to retrain the classification model 140. The training data generation module 130 can determine whether to continue to retrain the classification model 140 based on whether the effectiveness of the trained classification model 145 improved from the previous iteration or by determining whether there are any new support vectors in a set of documents, which are selected from unlabeled documents 170, closest to the classification hyperplane of the current trained classification model, and unseen by this model before.

Figure 2:
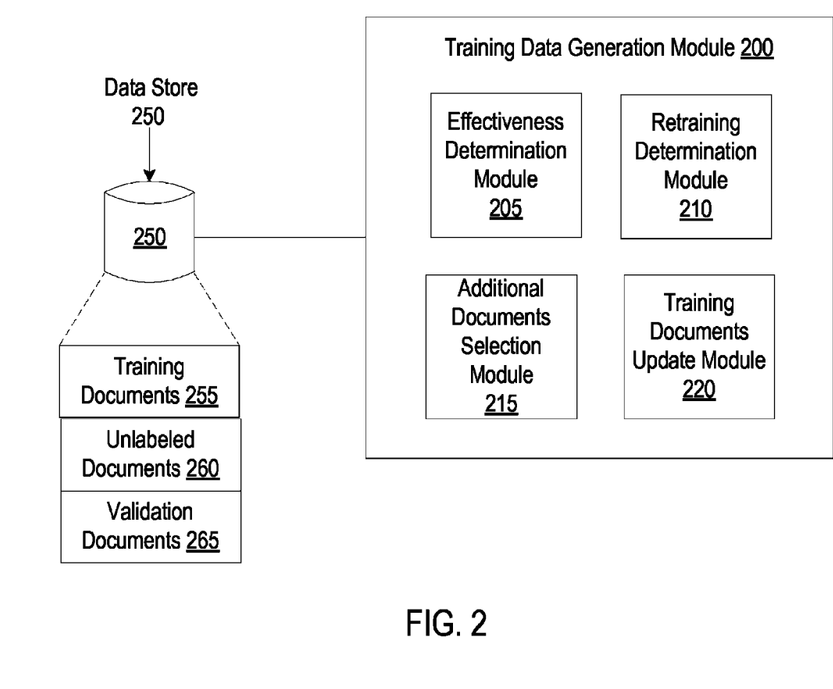
FIG. 2 is a block diagram of a training data generation module, in accordance with an embodiment.

FIG. 2 is a block diagram of a training data generation module 200, in accordance with one embodiment of the present invention. The training data generation module 200 includes an effectiveness determination module 205, a retraining determination module 210, an additional documents selection module 215, and a training documents update module 220. Note that in alternative embodiments, the functionality of one or more of the effectiveness determination module 205, the retraining determination module 210, the additional documents selection module 215, and the training documents update module 220 may be combined or divided.

In one embodiment, the effectiveness determination module 205 determines an effectiveness of a trained classification model (not shown) associated with a predictive coding system (not shown). In one embodiment, the effectiveness determination module 205 determines the effectiveness of the trained classification model by obtaining the effectiveness from the predictive coding system. In an alternate embodiment, the effectiveness determination module 205 determines the effectiveness of the trained classification model based on the trained classification model classification of validation documents, such as validation documents 265. The validation documents can be documents that are used to validate the trained classification model. In this embodiment, the effectiveness determination module 205 determines the effectiveness of the trained classification model by calculating an effectiveness measure of the trained classification model on the validation documents. For example, the effectiveness measure can be a precision of the trained classification model, a recall of the trained classification model, an F-measure of the trained classification model, etc. The precision for the trained classification model can be a measure of the fraction of the trained classification model-predicted positive validation documents that are actually positive (i.e., the fraction of the trained classification model-classified positive validation documents that are user-classified positives). The recall for the trained classification model can be a measure of the fraction of the actually positive validation documents that are trained classification model-predicted positives (i.e., the fraction of the user-classified positive validation documents that are trained classification model-classified positives). The F-measure for the trained classification model can be a harmonic mean of the precision and recall.

The retraining determination module 210 can determine whether to retrain the classification model (not shown). In one embodiment, the retraining determination module 210 determines whether to retrain the classification model by obtaining an indication from a user on whether the user would like to retrain the classification model. In an alternate embodiment, the retraining determination module 210 determines whether to retrain the classification model by determining whether the effectiveness of the trained classification model improved (once the classification model has already been retrained at least once). In another alternate embodiment, the retraining determination module 210 determines whether to retrain the classification model based on whether there are any new support vectors in a set of documents, which are selected from unlabeled documents 260 in data store 250, closest to the classification hyperplane of the current trained classification model, and unseen by this model before.

In one embodiment, if the classification model has been retrained, the retraining determination module 210 determines an effectiveness of the trained classification model to present to the user or to use to determine whether the effectiveness of the trained classification model improved. In one embodiment, the retraining determination module 210 determines the effectiveness of the trained classification model by obtaining the effectiveness, such as from the effectiveness determination module 205.

In an alternate embodiment, retraining determination module 210 determines whether the effectiveness of the current trained classification model is improvable by determining whether there are any new support vectors in a set of documents which are selected from unlabeled documents 260 in data store 250, closest to the classification hyperplane of the current trained classification model, and unseen by this model before, and determining whether to retrain the classification model based on whether there are any new support vectors.

In one embodiment, the additional documents selection module 215 selects a predetermined number of additional documents from unlabeled documents 260 in data store 250 as additional documents to add to the training documents in training documents 255. The training documents 255 can include electronic discovery documents used by the predictive coding system to train the classification model of the predictive coding system. The unlabeled documents 260 can include electronic discovery documents that have not been labeled, classified, or reviewed by a reviewer or administrator. In one embodiment, the predetermined number of additional documents selected by the additional documents selection module 215 is based on a batch size (e.g., 100) provided by a user or an administrator. In an alternate embodiment, the predetermined number of additional documents selected by the additional documents selection module 215 is based on a percentage (e.g., 0.01%) of the number of unlabeled documents in unlabeled documents 260. In an alternate embodiment, the predetermined number of additional documents selected by the additional documents selection module 215 is based on a percentage (e.g., 25%) of the number of documents in the current training documents 255.

The additional documents selection module 215 can select each of the additional documents by randomly choosing a group of unlabeled documents from unlabeled documents 260, calculating a score for each document in the chosen group of unlabeled documents, and selecting the document in the chosen group of unlabeled documents with the lowest score. In some embodiments, the additional documents selection module 215 randomly selects a certain number of documents for the chosen group. In some embodiments, the additional documents selection module 215 calculates the score for each document based on the document's distance to a decision hyperplane and angle diversity. The decision hyperplane can be based on building a classification model using a set of training documents. The document's distance to the decision hyperplane can be determined by calculating the distance from a document vector for the document to the decision hyperplane. Angle diversity can be based on a cosine similarity between a document vector for the document and document vectors for the documents in the set of additional training documents chosen so far (not shown). For example, the additional documents selection module 215 selects 59 unlabeled documents, calculates a score for each of the 59 documents based on its distance to a decision hyperplane and its angle diversity against the set of additional training documents chosen so far, selects the document from the 59 documents that has the lowest score as an additional document, and adds it to the set of additional training documents chosen so far, which was initially empty.

The training documents update module 220 can update the training documents used by the classification model (not shown) to include the additional documents selected by the additional documents selection module 215. The training documents update module 220 can update the training documents by obtaining a classification for each additional document and storing the additional document and its corresponding classification in a data store with a set of training documents, such as in training documents 255 in data store 250.

In one embodiment, the training documents update module 220 obtains a classification for each additional document from a user by presenting each additional document to the user via a user interface (not shown), receiving a classification for each additional document via the user interface, and storing the classifications in a data store, such as data store 250. In an alternate embodiment, the training documents update module 220 obtains the classification for each additional document from a user by obtaining the classifications from a data store, such as data store 250.

In one embodiment, the training documents update module 220 provides an indication to a predictive coding system (not shown) or a classification model (not shown) that the training documents in training documents 255 have been updated to cause the classification model to be retrained using the training documents in training documents 255.

Figure 3:
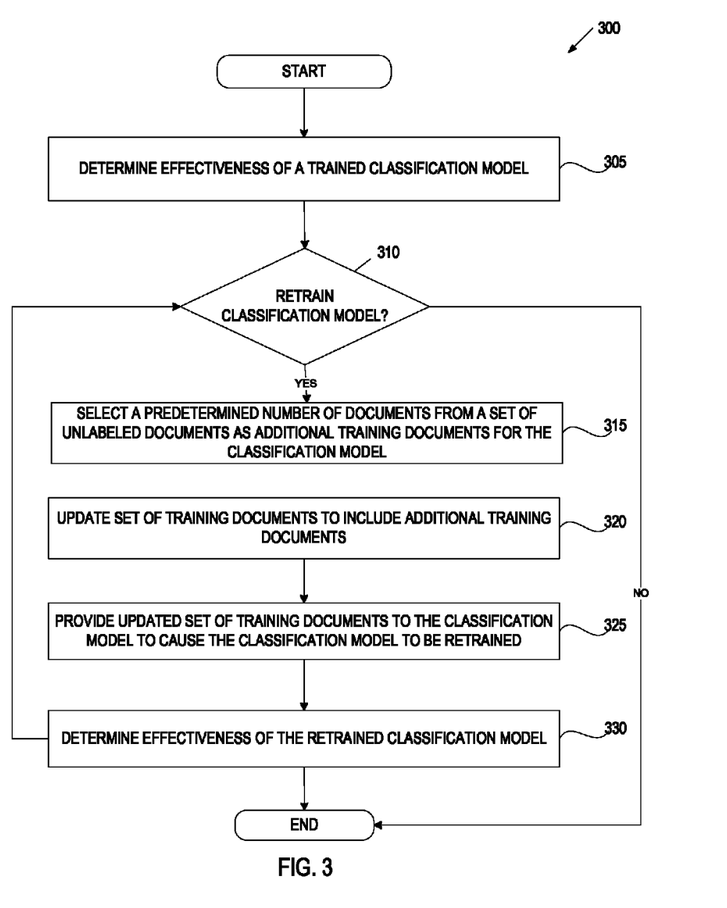
FIG. 3 is a flow diagram for a method of generating training data for a predictive coding system, in accordance with an embodiment.

FIG. 3 is a flow diagram of an embodiment of a method 300 for generating training data for a predictive coding system in e-discovery. The method 300 is performed by processing logic that may comprise hardware (circuitry, dedicated logic, etc.), software (such as is run on a general purpose computer system or a dedicated machine), or a combination of both. In one embodiment, the method 300 is performed by the predictive coding system 110 of FIG. 1. The method 300 may be performed by a training data generation module 130 running on the predictive coding system 110 or another machine.

At block 305, processing logic determines an effectiveness of a trained classification model. In one embodiment, the trained classification model is a predictive coding engine including an SVM model that is trained based on the initial training set (e.g., a first trained classification model). An untrained classification model can be the predictive coding engine including the SVM model that has not yet been trained using a training set. In one embodiment, processing logic determines the effectiveness of the trained classification model by obtaining the effectiveness from a predictive coding system associated with the trained classification model. In an alternate embodiment, processing logic determines the effectiveness of the trained classification model based on the classification of a set of validation documents by the trained classification model. In this embodiment, processing logic determines the effectiveness of the trained classification model by calculating an effectiveness measure of the trained classification model on the set of validation documents. For example, the effectiveness measure can be a precision of the trained classification model, a recall of the trained classification model, an F-measure of the trained classification model, etc.

A document is a true positive if the classification of the document by the trained classification model is positive and the classification of the document by the user is positive. A document is a false positive if the classification of the document by the trained classification model is positive and the classification of the document by the user is negative. A document is a true negative if the classification of the document by the trained classification model is negative and the classification of the document by the user is negative. A document is a false negative if the classification of the document by the trained classification model is negative and the classification of the document by the user is positive.

The precision for the trained classification model can be defined as:

$$precision=TP/(TP+FP), \text{ where}$$

TP is the number of true positives in the set of validation documents, and

FP is the number of false positives in the set of validation documents.

The recall for the trained classification model can be defined as:

$$recall=TP/(TP+FN), \text{ where}$$

TP is the number of true positives in the set of validation documents, and

FN is the number of false negatives in the set of validation documents.

The F-measure for the trained classification model can be defined as:

$$F\text{-measure}=(2*\text{precision}*\text{recall})/(\text{precision}+\text{recall}).$$

At block 310, processing logic determines whether to retrain the classification model. If processing logic determines to retrain the classification model, the method 300 proceeds to block 315. If processing logic determines not to retrain the classification model, the method 300 ends.

In one embodiment, processing logic determines whether to retrain the classification model by obtaining an indication from a user on whether the user would like to retrain the classification model. In one embodiment, processing logic can present or provide the effectiveness of the current trained classification model to the user to assist the user in deciding whether to retrain the classification model.

In an alternate embodiment, processing logic determines whether to retrain the classification model by determining whether the effectiveness of the current trained classification model improved and continuing to retrain the classification model if the effectiveness of the retrained classification model improved. The effectiveness of the current trained classification model should be greater than the effectiveness of the last trained classification model for the processing logic to determine that the classification model should be retrained. For example, if the last trained classification model had an effectiveness of 0.75 or 75% and the effectiveness of the current trained classification model is 0.90 or 90%, processing logic will determine that the effectiveness of the trained classification model improved and that the classification model should be retrained.

In an alternate embodiment, processing logic determines whether the effectiveness of the trained classification model is improvable by selecting a set of documents which are from unlabeled documents and closest to the classification hyperplane of the current trained classification model and unseen by this model before, determining whether any new support vectors are found and determining whether to retrain the classification model based on whether there are any new support vectors. Processing logic can determine whether any new support vectors are found by determining whether any documents in a new set of additional training documents lie within a margin on a decision hyperplane associated with the current trained classification model. A decision hyperplane can separate a set of documents based on their class memberships (e.g., confidential, not confidential, relevant, not relevant, privileged, not privileged, responsive, not responsive, etc.). The margin of the current trained classification model can be the distance from the decision hyperplane to the closest data point (i.e., document vector) representing one of the documents in the set of training documents used to build the current trained classification model. If any document in the new set of additional training documents falls within or at the margin, processing logic can determine that new support vectors are found, and that the classification model should be retrained. If none of the documents in the new set of additional training documents fall within or at the margin, processing logic can determine that no new support vectors are found and that the classification model should not be retrained.

Each time a classification model is retrained using the training data, the support vectors that are used to draw the decision hyperplane are identified by the SVM engine. If new support vectors are found, the decision hyperplane can be further refined. If there are no new support vectors, the decision hyperplane cannot be refined any further.

At block 315, processing logic selects a predetermined number of documents from a set of unlabeled electronic discovery documents as additional training documents. In one embodiment, the predetermined number of documents is a batch size (e.g., 100) selected by a user or an administrator of the predictive coding system. In an alternate embodiment, the predetermined number of documents that are selected as additional training documents is a percentage of the number of documents in the set of unlabeled electronic discovery documents (e.g., 0.01%). In an alternate embodiment, the predetermined number of documents that are selected as additional training documents is a percentage of the number of documents in the current set of training documents (e.g., 25%). The set of additional training documents can be selected for retraining the classification model in a predictive coding system. One embodiment of selecting a predetermined number of documents from an unlabeled set of documents as additional training documents is described in greater detail below in conjunction with FIG. 4.

At block 320, processing logic updates the set of training documents to include the additional training documents. Processing logic can update the set of training documents to include the additional training documents by obtaining a classification of each additional training document from an administrator or reviewer and adding each labeled additional training document to the set of training documents.

At block 325, processing logic provides the updated set of training documents to the classification model to cause the classification model to be retrained. Processing logic can provide the updated set of training documents to the classification model by storing the updated set of training documents in storage accessible to the classification model and providing an indication to the classification model or to the predictive coding system to retrain the (untrained) classification model (e.g., an SVM model) based on the updated set of training documents. When the classification model is retrained, a trained classification model may be generated (e.g., a second trained classification model).

At block 330, processing logic determines an effectiveness of the retrained classification model. In one embodiment, processing logic determines the effectiveness of the retrained classification model (e.g., second trained classification model) by obtaining the effectiveness from the predictive coding system. In an alternate embodiment, processing logic determines the effectiveness of the retrained classification model based on the classification of a set of validation documents by the retrained classification model. In this embodiment, processing logic determines the effectiveness of the retrained classification model by calculating an effectiveness measure of the retrained classification model on the set of validation documents. For example, the effectiveness measure can be a precision of the retrained classification model, a recall of the retrained classification model, an F-measure of the retrained classification model, etc.

Figure 4:
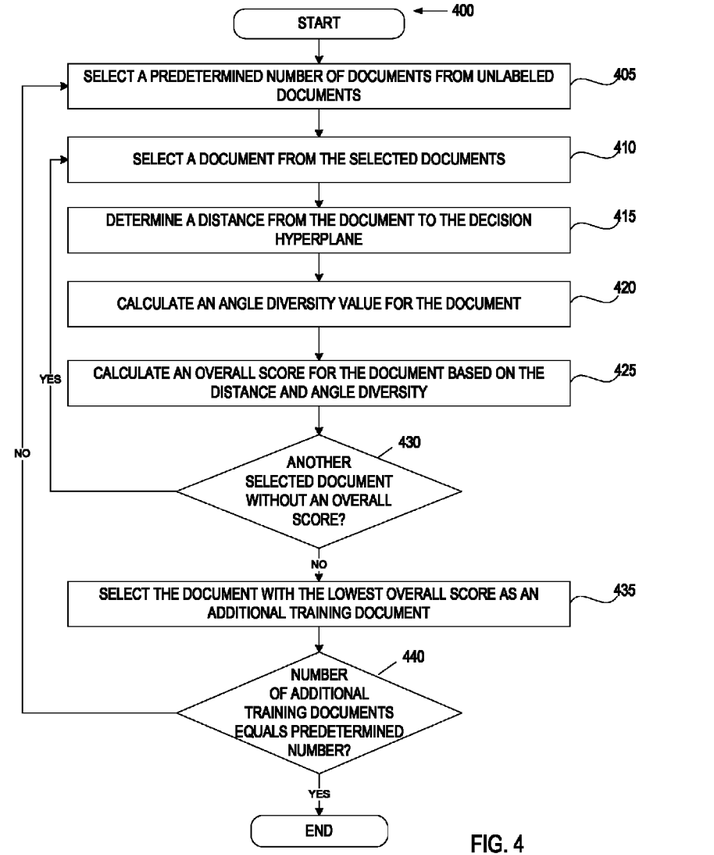
FIG. 4 is a flow diagram for a method of selecting a number of documents from an unlabeled set of documents, in accordance with an embodiment.

FIG. 4 is a flow diagram of an embodiment of a method 400 for selecting a predetermined number of documents from an unlabeled set of documents as additional training documents. The method 400 is performed by processing logic that may comprise hardware (circuitry, dedicated logic, etc.), software (such as is run on a general purpose computer system or a dedicated machine), or a combination of both. In one embodiment, the method 400 is performed by the predictive coding system 110 of FIG. 1. The method 400 may be performed by a training data generation module 130 running on the predictive coding system 110 or another machine.

At block 405, processing logic selects a predetermined number of documents from a set of unlabeled documents in a corpus of documents. In one embodiment, the corpus of documents includes electronic documents used for training a classification model of a predictive coding system, validating the trained classification model of the predictive coding system, testing the trained classification model of the predictive coding system, and/or unlabeled documents. The unlabeled documents are documents that have not yet been classified by the predictive coding system or reviewed by a user or administrator of the predictive coding system. Processing logic can randomly select the predetermined number of documents from the set of unlabeled documents. In one embodiment, processing logic calculates the predetermined number based on a probability, such as a probability that a document is among the top p (a percentage, e.g., p=5%) closest unlabeled documents to a decision hyperplane associated with the trained classification model for the predictive coding system. For example, for a probability of (1−q), where q=0.05, and a percentage p=5%, the predetermined number of unlabeled documents would ensure with a probability of 0.95 that among this predetermined number of documents, the closest document to the decision hyperplane is among the top 5% closest unlabeled documents to the decision hyperplane. The predetermined number can be calculated as $(\log(q)/\log(1-p))$. Using the previous example, for a percentage p of 5% and a probability of 0.95 (1−q=0.95 so q=0.05), the predetermined number is $(\log(0.05)/\log(1-5\%))$=58.4, which is rounded up to 59 documents. In this embodiment, the predetermined number is not based on the number of unlabeled documents available to the predictive coding system and is independent of the number of unlabeled documents. In an alternate embodiment, the predetermined number is a predefined number selected by a user or administrator, such as 59 documents. In another alternate embodiment, processing logic calculates the predetermined number based on a percentage of the number of unlabeled documents available to the predictive coding system, such as 0.01% of the number of unlabeled documents. For example, if there are 1,000,000 unlabeled documents available to the predictive coding system, processing logic would calculate the predefined number of documents to select as 1,000,000*0.01%=100 documents.

At block 410, processing logic selects a document from the selected documents. In one embodiment, processing logic randomly selects the document from the predetermined number of documents. In an alternate embodiment, processing logic can select the documents in order, such as a list order (e.g., first document in the set of selected documents, second document in the set of selected documents, etc.).

At block 415, processing logic determines a distance from the document to a decision hyperplane. The decision hyperplane can be based on building a (trained) classification model based on a set of training documents. The distance from the document to the decision hyperplane can be determined by calculating the distance from a document vector for the document to the decision hyperplane. At block 420, processing logic calculates an angle diversity value for the document. Processing logic can calculate the angle diversity value for the document based on a document vector for the document and the cosine similarity between the document vector for the document and the document vectors for the set of additional training documents chosen so far.

A document can be represented by a document vector, which is a vector of term frequency-inverse document frequency (TF-IDF) weighted terms in the document. The TF-IDF weighted terms reflect how important the terms are to the document. Cosine similarity is a measure of similarity between two document vectors that is calculated by measuring the cosine of the angle between the two document vectors. If the cosine similarity between two document vectors is large, the two documents corresponding to the document vectors can be determined to be very similar to each other. If the cosine similarity between two document vectors is small, the two documents corresponding to the document vectors can be determined to not be very similar to each other.

Angle diversity can be defined based on the cosine similarity between two document vectors in the SVM feature space associated with the trained classification model of the predictive coding system. Processing logic can calculate the angle diversity for the document against the current set of additional training documents (i.e., the set of additional training documents chosen so far in the current batch) as the cosine similarity between the document and a document most similar to the document in the current set of additional training documents. Processing logic can calculate the angle diversity value for a document in the set of selected documents using a kernel function in the predictive coding system (e.g., in the SVM model of the predictive coding system) and determine the largest cosine similarity value between the document and each of the documents in the current set of additional training documents. For example, a set R has 59 randomly selected unlabeled documents r1, r2, . . . , r59, a set S has all the 3 (three) additional training documents already chosen so far in the current batch, s1, s2, and s3, and d(a, b) denotes the cosine similarity between documents a and b in the SVM feature space. In this example, the cosine similarity values d(r1, sj), j=1, 2, and 3 are calculated using a kernel function and the largest cosine similarity value is determined from the 3 (three) calculated cosine similarities by comparing the values. If the largest cosine similarity value is d(r1, s1), then r1 is the most similar to the additional training document s1 (rather than s2 or s3), and the largest cosine similarity value d(r1, s1) is used as the angle diversity for document r1 against the set S.

At block 425, processing logic can calculate an overall score for the document based on the distance and angle diversity. In one embodiment, the overall score can be defined as:

Overall score=lambda*(distance)+(1−lambda)*(angle diversity), where angle diversity=(cosine similarity between the document and a document most similar to the document in the current set of additional training documents).

In some embodiments, the parameter lambda can be any value between 0.0 and 1.0, such as 0.5. If lambda is 0.5, both the distance and the angle diversity are important when a document is selected as an additional training document. If lambda is 1.0, a document with the smallest distance to the decision hyperplane will be selected as an additional training document. If lambda is 0.0, a document with the smallest angle diversity value (i.e., the document approximately most different from all documents in the current set of additional training documents) will be selected as an additional training document. When lambda is 0.0, the document selected is approximately the best "worst case" document because it can help yield approximately the minimum worst case version space volume and therefore help make great effectiveness improvement for the classification model. When lambda is 1.0, the document selected can be the most informative document because it is the closest document to the decision hyperplane and therefore the most difficult document to classify, and can be the most useful new training document that the classification model needs to be retrained with.

At block 430, processing logic determines whether another selected document does not have an overall score (from the predetermined number of documents selected from the unlabeled documents). If processing logic determines that another selected document does not have an overall score, the method 400 can return to block 410 to calculate an overall score for the another selected document. If processing logic determines that another selected document has an overall score (meaning that all selected documents have an overall score), the method 400 can proceed to block 435.

At block 435, processing logic selects the document with the lowest overall score as an additional training document to be included in a set of training documents for a classification model in a predictive coding system. Depending on the value of the parameter lambda, by selecting the document with the lowest overall score as the additional training document, processing logic can ensure that the document selected to be an additional training document is both close to the decision hyperplane of the current trained classification model, and very different from all those documents already in the current set of additional training documents. Processing logic can select the document with the lowest overall score as the additional training document by comparing the overall scores for the documents selected from the unlabeled documents. For example, if the smallest overall score among a set of 59 documents selected from the unlabeled documents is the overall score for document 12, document 12 will be selected and included in (e.g., added to) the set of additional training documents.

At block 440, processing logic determines whether the number of additional training documents equals a predetermined number. In one embodiment, the predetermined number is a batch size (e.g., 100) selected by a user or an administrator of the predictive coding system. In an alternate embodiment, the predetermined number of documents is a percentage of the number of documents in the set of unlabeled electronic discovery documents (e.g., 0.01%). For example, if the batch size is 100 documents and 50 additional documents have been selected as additional training documents, the method 400 will repeat 50 additional times to select a total of 100 documents to add to the set of training documents. If processing logic determines that the number of additional training documents does not equal the predetermined number, the method 400 returns to block 405 to determine another additional training document to add to the set of training documents. If processing logic determines that the number of additional training documents does equal the predetermined number, the method 400 ends.

Figure 5:
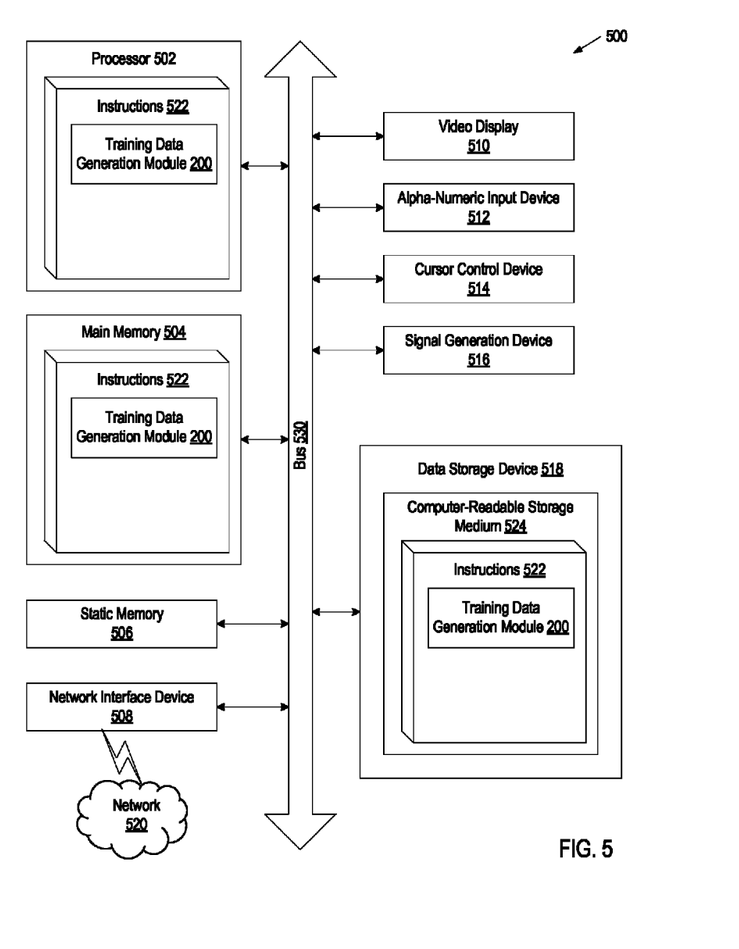
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a training data generation module (e.g., training data generation module 200 of FIG. 2) and/or a software library containing methods that call a training data generation module. While the computer-readable storage medium 524 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that causes the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "calculating," "providing," "receiving," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    determining to improve an effectiveness measure of a first trained classification model, wherein the first trained model is trained using a set of training documents;
    selecting a plurality of unlabeled documents, wherein the plurality of unlabeled documents are not part of the set of training documents used to train the first trained classification model;
    generating a support vector based on a determination that one or more of the plurality of unlabeled documents are within a margin of a decision hyperplane associated with the first trained classification model;
    calculating, by a processor in a predictive coding system, an overall score for each unlabeled document of the plurality of unlabeled documents based on a distance of a respective unlabeled document to the decision hyperplane and an angle diversity of the respective unlabeled document;
    comparing, by the processor in the predictive coding system, the overall scores of the unlabeled documents to each other to select a pre-determined number of unlabeled documents having lowest scores in the plurality of unlabeled documents;
    updating, by the processor in the predictive coding system, the set of training documents used to train the first trained classification model by adding the pre-determined number of unlabeled documents having the lowest scores in the plurality of unlabeled documents to the set of training documents;
    updating the decision hyperplane based on the support vector;
    providing, by the predictive coding system, the updated set of training documents to the first trained classification model to improve the effectiveness measure of the first trained classification model by generating a second trained classification model from the updated set of training documents;
    identifying an effectiveness measure of the second trained classification model; and
    generating a third trained classification model based on a determination that the effectiveness measure of the second trained classification model has improved from the effectiveness measure of the first trained classification model.

2. The method of claim 1, wherein generating the second trained classification model further comprises:
    upon determining to generate the second trained classification model, repeating, by the predictive coding system, the updating of the set of the training documents.

3. The method of claim 1, further comprising
    calculating the effectiveness measure of the second trained classification model on a set of validation documents.

4. The method of claim 1, wherein calculating the overall score for each unlabeled document comprises:
    calculating the distance from the respective unlabeled document to the decision hyperplane;
    calculating the angle diversity value for the respective unlabeled document;
    applying a parameter value to the distance and the angle diversity value of the respective unlabeled document; and
    calculating the overall score for the respective unlabeled document based on a sum of the parameter value being applied to the distance and the parameter value being applied to the angle diversity value.

5. A non-transitory computer-readable storage medium having instructions that, when executed by a processing device, cause the processing device to perform operations comprising:

determining to improve an effectiveness measure of a first trained classification model, wherein the first trained model is trained using a set of training documents;

selecting a plurality of unlabeled documents, wherein the plurality of unlabeled documents are not part of the set of training documents used to train the first trained classification model;

generating a support vector based on a determination that one or more of the plurality of unlabeled documents are within a margin of a decision hyperplane associated with the first trained classification model;

calculating, by the processing device, an overall score for each unlabeled document based on a distance of a respective unlabeled document to the decision hyperplane and an angle diversity of the respective unlabeled document;

comparing, by the processing device, the overall scores of the unlabeled documents to each other to select a pre-determined number of unlabeled documents having lowest scores in the plurality of unlabeled documents;

updating the set of training documents used to train the first trained classification model based by adding the predetermined number of unlabeled documents having the lowest scores in the plurality of unlabeled documents to the set of training documents;

updating the decision hyperplane based on the support vector;

providing the updated set of training documents to the first trained classification model to improve the effectiveness measure of the first trained classification model by generating a second trained classification model from the updated set of training documents;

identifying an effectiveness measure of the second trained classification model; and generating a third trained classification model based on a determination that the effectiveness measure of the second trained classification model has improved from the effectiveness measure of the first trained classification model.

6. The non-transitory computer-readable storage medium of claim 5, wherein generating the second trained classification model further comprises:

upon determining to generate the second trained classification model, repeating the updating of the set of the training documents.

7. The non-transitory computer-readable storage medium of claim 5, further comprising:

calculating the effectiveness measure of the second trained classification model on a set of validation documents.

8. The non-transitory computer-readable storage medium of claim 5, wherein calculating the overall score for each unlabeled document comprises:

calculating the distance from the respective unlabeled document to the decision hyperplane;

calculating the angle diversity value for the respective unlabeled document;

applying a parameter value to the distance and the angle diversity value of the respective unlabeled document; and calculating the overall score for the respective unlabeled document based on a sum of the parameter value being applied to the distance and the parameter value being applied to the angle diversity value.

9. A system comprising:
a memory; and
a processing device coupled to the memory, wherein the processing device is to:

determine to improve an effectiveness measure of a first trained classification model, wherein the first trained model is trained using a set of training documents;

select a plurality of unlabeled documents, wherein the plurality of unlabeled documents are not part of the set of training documents used to train the first trained classification model;

generate a support vector based on a determination that one or more of the plurality of unlabeled documents are within a margin of a decision hyperplane associated with the first trained classification model;

calculate an overall score for each unlabeled document based on a distance of a respective unlabeled document to the decision hyperplane and an angle diversity of the respective unlabeled document;

compare the overall scores of the unlabeled documents to each other to select a pre-determined number of unlabeled documents having lowest scores in the plurality of unlabeled documents;

update the set of training documents used to train the first trained classification model by adding the pre-determined number of unlabeled documents having the lowest scores in the plurality of unlabeled documents to the set of training documents;

update the decision hyperplane based on the support vector;

provide the updated set of training documents to the first trained classification model to improve the effectiveness measure of the first trained classification model by generating a second trained classification model from the updated set of training documents;

identify an effectiveness measure of the second trained classification model; and generate a third trained classification model based on a determination that the effectiveness measure of the second trained classification model has improved from the effectiveness measure of the first trained classification model.

10. The system of claim 9, wherein the processing device is further to, upon determining to generate the second trained classification model, repeat the updating of the set of training documents.

11. The system of claim 9, wherein the processing device further calculates the effectiveness measure of the second trained classification model on a set of validation documents.

12. The system of claim 9, wherein the processing device is to calculate the overall score for each unlabeled document by:

calculating the distance from the respective unlabeled document to the decision hyperplane;

calculating the angle diversity value for the respective unlabeled document;

applying a parameter value to the distance and the angle diversity value; and calculating the overall score for the respective unlabeled document based on a sum of the parameter value being applied to the distance and the parameter value being applied to the angle diversity value.

* * * * *